US006630660B1

United States Patent
Finn

(12) United States Patent
(10) Patent No.: US 6,630,660 B1
(45) Date of Patent: Oct. 7, 2003

(54) IMAGE PROCESSING SYSTEM AND METHOD FOR REMOVING OR COMPENSATING FOR DIFFRACTION SPOTS

(75) Inventor: Harry J Finn, Lytham (GB)

(73) Assignee: BAE Systems plc, London (GB)

( * ) Notice: Subject to any disclaimer, the term of this patent is extended or adjusted under 35 U.S.C. 154(b) by 153 days.

(21) Appl. No.: 09/701,513
(22) PCT Filed: Aug. 15, 2000
(86) PCT No.: PCT/GB00/03157
§ 371 (c)(1), (2), (4) Date: Nov. 30, 2000
(87) PCT Pub. No.: WO01/14904
PCT Pub. Date: Mar. 1, 2001

(30) Foreign Application Priority Data

Aug. 23, 1999 (GB) .............................................. 9919947

(51) Int. Cl.[7] .................................................. H01J 5/16
(52) U.S. Cl. ............................... 250/237 G; 250/237 R
(58) Field of Search ......................... 250/237 G, 237 R, 250/208.1

(56) References Cited

U.S. PATENT DOCUMENTS

| 5,003,600 A | * | 3/1991 | Deason et al. .......... 250/237 G |
| 5,311,019 A | | 5/1994 | Gammarino |
| 5,325,176 A | | 6/1994 | Suda et al. |
| 5,483,058 A | * | 1/1996 | Leviton ................... 250/237 G |
| 5,600,123 A | | 2/1997 | Purrazzella |
| 6,118,119 A | * | 9/2000 | Ruschin ................... 250/237 G |

FOREIGN PATENT DOCUMENTS

| GB | 2 294 171 | 4/1996 |
| WO | 92/15024 | 9/1992 |
| WO | 97/41460 | 11/1997 |

* cited by examiner

*Primary Examiner*—Ricky Mack
*Assistant Examiner*—Alicia M Harrington
(74) *Attorney, Agent, or Firm*—Nixon & Vanderhye P.C.

(57) ABSTRACT

Method and apparatus for determining the location at which radiation is incident on the sensor system which includes an EMI screening mesh by comparing the actual image detected, which includes the higher order diffraction effects, with a search or sample image applied sequentially at different locations and determing the location of the sample image which gives the closest match. The sample image corresponds to an expected pattern or image from a point source incident at a particular location on a particular window/sensor system, and may be generated from a real source of known location and properties incident on the system, or may be a generated image, such as a standard image such as a cross pattern or determined mathematically, for example using Fourier transforms. Preferably, once the location of the point of incidence of the radiation has been determined, image processing techniques are applied to remove the diffraction spots.

23 Claims, 4 Drawing Sheets

IMAGE PROCESSING SYSTEM AND METHOD FOR REMOVING OR COMPENSATING FOR DIFFRACTION SPOTS

This application is the U.S. national phase of International Application No. PCT/GB00/03157, filed Aug. 15, 2000, which designated the U.S., the entire content of which is hereby incorporated by reference.

BACKGROUND OF THE INVENTION

1. Field of the Invention

In many imaging and detection systems for the imaging or detection of a source of electromagnetic radiation, it is desirable to provide an optical window which allows the transmission of the radiation of interest, but which provides electromagnetic interference (EMI) shielding and/or gives a low radar signature to help prevent detection of the optical aperture. Systems where such optical windows are provided include military platforms where it is desirable that the platform be hard to detect by radar, and in particular to target detection systems provided in such platforms, and to all forms of sensor or electrical systems which are sensitive to electro-magnetic interference.

2. Discussion of Prior Art

Known windows for use in such applications include those formed from a bulk semiconductor substrate, those coated with a continuous semiconductor or metallic coating, those formed as free-standing meshes and those formed as metallic meshes deposited on an optical substrate. Each of these known windows have their disadvantages.

A common form of optical window used, especially for EMI screening, is in the form of a fine regular linear metallic grid formed by conducting wires or tracks to form a regular square open structure on an optical substrate. In this case, the optical substrate is a multi-spectral optical material which allows transmission of a wide range of electromagnetic radiation wavelengths, including radio frequency energy.

Due to diffraction scatter and emission by the grid, there is the potential problem of increased noise due to the provision of the grid compared to a window comprising only an optical substrate. Especially where there is an intense source of radiation, the resulting image viewed through the optical window may include a two-dimensional array of spots centred around the actual point of incidence of the source of the radiation in the image plane due to the grid acting as a two-dimensional diffraction grating. In some circumstances, even when the actual source of radiation is outside the field of view of the optical equipment associated with the sensor, some false spots can be detected. Where the window of this type is used with a target detection system, this can lead to detection of a false target.

SUMMARY OF THE INVENTION

According to a first aspect of the present invention, a sensor system comprises:
 a window including a mesh comprising an array of generally linear electrically conductive elements;
 a sensor for detecting radiation of a predetermined wavelength or range of wavelengths passing through the window; and,
 a means for determining the angle of incidence of the radiation at the sensor.

By determining the angle of incidence of the radiation at the sensor, it is possible to overcoming the problem of "false spots" occurring in the detected image due to diffraction, and to clearly identify the location of the source. For example, in a target detection system, this ensures that the actual target is identified and located, and not an imaginary target corresponding to one of the false spots.

The sensor may be a charge coupled device. The detected image is preferably stored in memory for subsequent analysis.

Preferably the means for determining the location angle of incidence of the radiation includes a memory for storing a sample image representative of an expected image including the higher order diffraction effects due to the mesh, a comparator for comparing the actual image detected with the sample image overlayed sequentially at different locations of the actual image, and a detector for detecting the location at which the sample image corresponds most closely to the actual image, and determining the centre of the image as the centre of the sample image at that location.

The sample image stored in the memory may be a sample determined from an actual, known, sample source incident at a known location on the window of the sensor. Alternatively, a standardised image, such as a cross-pattern, or a simulated image determined mathematically can be used. In the case of a simulated image, this is preferable based on a Fourier transform of the grid at the desired frequency.

It is preferred that the apparatus further comprises a means to remove or compensate for the diffraction spots due to the higher order diffraction by the window at the predetermined wavelength or range of wavelengths. This results in the viewed or observed image comprising only the image incident on the window of the sensor without the higher order diffraction elements due solely to the provision of the grid.

The compensation means preferably alters the value of the pixels corresponding to the diffraction spots. Advantageously, this is achieved by selecting a group of pixels including the diffraction spot, and adjusting the value of the pixels forming the diffraction spot to correspond to the background. The pixels forming the diffraction spot are preferably determined by analysis of the value of the pixels in the group. This is advantageous as it compensates for any variation between the actual location of the diffraction spot and the expected location. Such variation may be due to the skew of the mesh or a variation in the frequency of the actual incident radiation compared to that for which the sample image was formed.

Preferably the sensor system includes a filter to prevent radiation with wavelengths outside the predetermined range passing through the window.

Preferably the mesh is formed on a transparent optical substrate. In this way, the substrate gives structure to the window allowing this to survive, particularly in military or industrial environments. This also allows for the window to seal an aperture in which it is used.

Where the mesh is formed on a transparent substrate, it is preferred that the substrate is selected as one having good transmissive properties at the wavelengths of radiation which it is desired to detect. Where electromagnetic radiation in the visible or longwave infra-red ranges is to be transmitted, it is preferred that the substrate is clear grade zinc sulphide or similar.

The grid may be formed on the outer surface of the optical substrate, or may be formed on the inner surface or be embedded within the optical substrate. Where the grid is formed on the substrate, an optically transmissive protective layer may be formed over the grid.

Although a discrete window may be provided, the mesh may be formed directly on the outer surface of the sensor.

A preferred application of the sensor is in a target detection system.

According to a further aspect of the present invention, a method for compensating for higher order diffraction resulting from a mesh on a window comprises the steps of:

comparing the detected image with a sample image located sequentially at different locations on the image; and, determining the location of the sample image at which the actual image most closely corresponds to the sample image, and determining the point of incidence of the radiation forming the actual image as the centre of the sample image at that location.

With the method according to this aspect of the invention, it is possible to locate the point of incidence of the radiation on the window, and to avoid the problems associated with the detection of false spots.

With the method according to the invention, the angular location at which the detected radiation is incident on the sensor is determined. This is achieved by comparing the actual image detected, which includes the higher order diffraction effects, with a search or sample image applied sequentially at different locations. The sample image corresponds to an expected pattern or image from a point source incident at a particular location on a particular window. The sample image may be generated from a real source of known location and properties incident on the window or sensor. Alternatively, the image may be a generated image, such as a standard image such as a cross pattern which has been found to approximate the diffraction effects, or determined mathematically, for example using Fourier transforms.

The determination of the location of the sample image which most closely matches the real image is preferably achieved by comparing the value of individual pixels of the real and sample images, summing the results of these comparisons, and determining the location of the sample image giving the minimum difference between the two images. Whilst all pixels of the images can be compared, it is preferred that only a limited number of pixels are compared. In particular, it is preferred that only those pixels with a value above a certain threshold are compared, namely pixels corresponding to a certain level of brightness. By considering only a restricted number of pixels, the comparison process is quicker compared to the comparison of all pixels. Further, as only the brighter pixels correspond to the image which is to be detected, the comparison of only these pixels gives a more accurate result. The threshold above which pixels are considered may be a predetermined threshold, or may be based on an average of the value of the pixels of the image.

Preferably, the method comprises the further step of determining and removing the higher order diffractions spots of the actual image based on the expected effects for radiation incident at the determined location. In particular, once the location of the radiation on the sensor is known, and knowing the wavelengths of the radiation based on the known response of the system, the expected location of the diffraction spots can be determined. The pixels corresponding to the expected locations of the diffractions spots can then be adjusted to remove the spots, for example by making these correspond to a background level.

It is preferred that the spots are removed by taking a group of pixels including those which are expected to contain the diffraction spots, identify those pixels within the group which correspond to the diffraction spots, and adjusting the value of those spots. By taking a group of pixels including those expected to correspond to the diffraction spot, any slight variation between the actual location of the diffraction spot and the expected location, for example due to skew of the grid or due to variation in the wavelength of the radiation, can be compensated for.

It is preferred that the pixels in the group of pixels which correspond to the diffraction spot are determined by determining the frequency or number of pixels within the group of each value. In this case, it is expected that the determination will show two maxima, one corresponding to the background level and one to the level for the diffraction spots, separated by a minima. In this case, all pixels having a value greater than that at the minima can be determined to correspond to the diffraction spot. These pixels are preferably adjusted to correspond to the background level. This is preferably achieved by adjusting the value of the pixel to the average of the value of the surrounding pixels which are determined not to form part of the diffraction spot.

BRIEF DESCRIPTION OF THE DRAWINGS

A particular example of the present invention will be described in accordance with the accompanying drawings, in which:

FIG. 6 shows a mathematically determined one-dimensional profile for a

DETAILED DISCUSSION OF EMBODIMENTS

Figure 1:
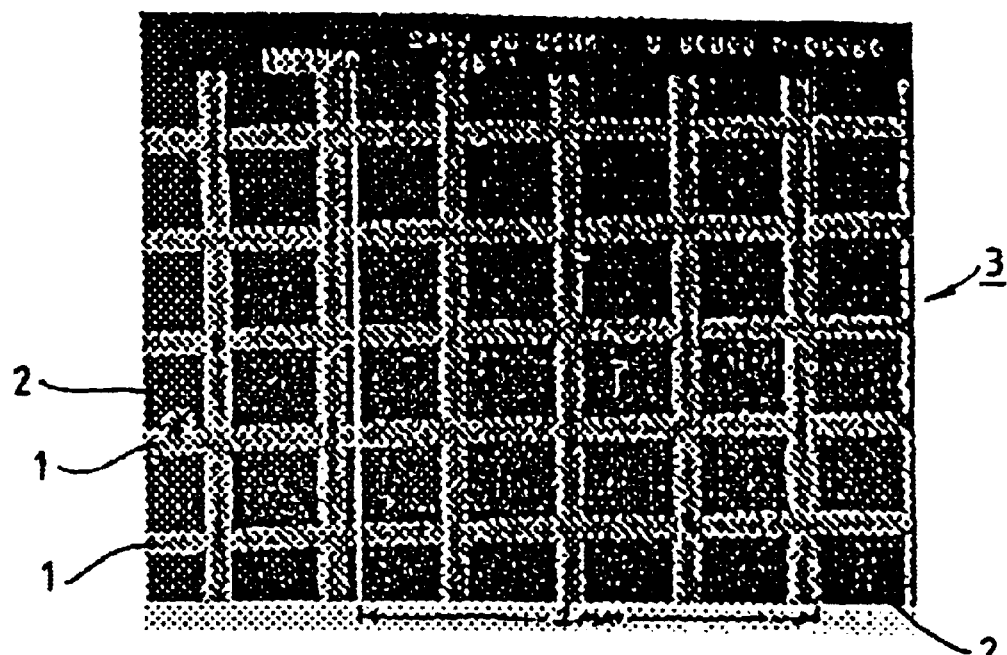
FIG. 1 shows an optical window with a regular mesh structure.

As shown in FIG. 1, a conventional optical window 3 includes a regular conductive mesh formed by a number of parallel and perpendicularly extending linear conductors 1 formed on an optically transparent substrate 2.

Figure 2:
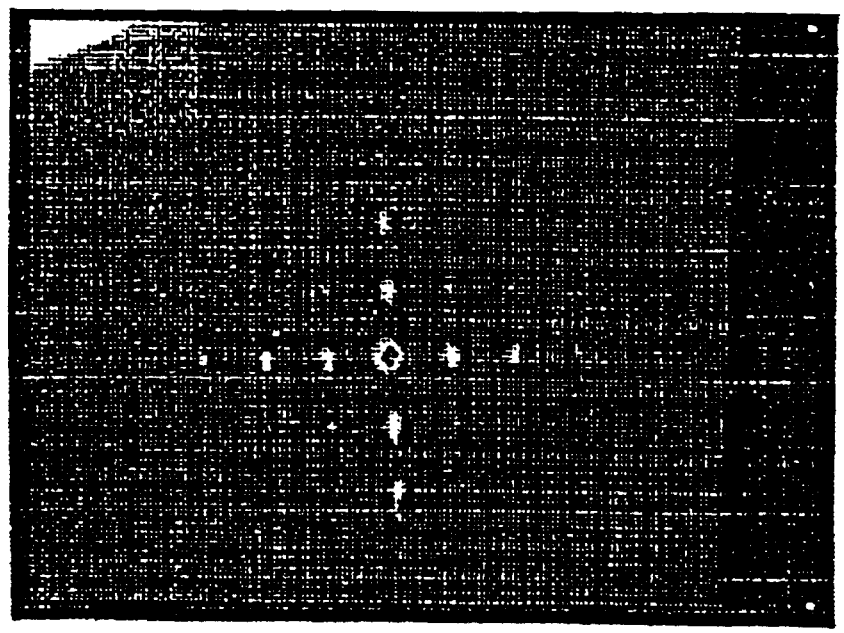
FIG. 2 shows a typical image of an intense radiation source through the window of FIG. 1.

As shown in FIG. 2, when an intense source of radiation is incident upon the optical window, the grid acts as a two-dimensional diffraction grating, and accordingly, in addition to the actual image of the source of radiation, a number of false images will be observed. These will be in a two-dimensional pattern with respect to the real image.

Figure 3:
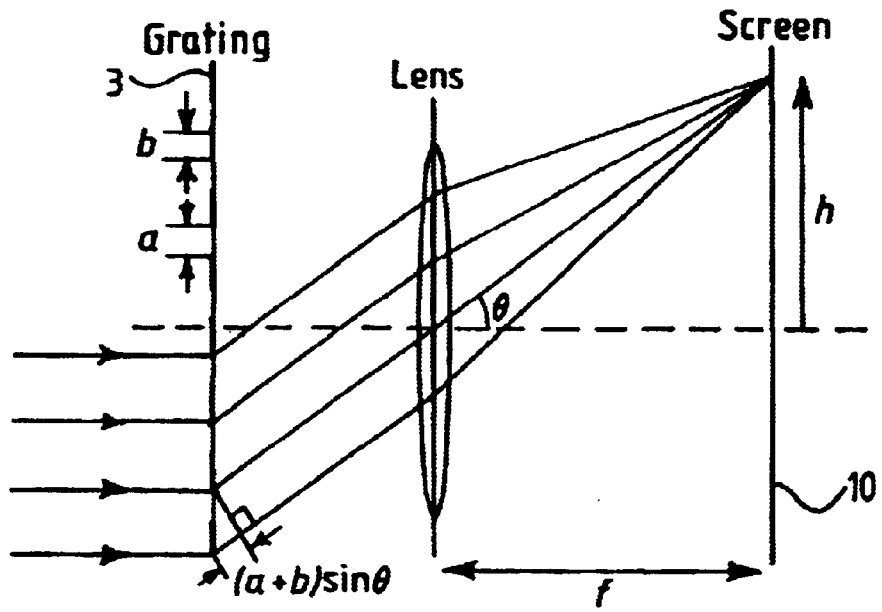
FIG. 3 shows a schematic diagram of a sensor according to the present invention.

According to one example of the present invention, as shown schematically in FIG. 3, a charge coupled device 10 is provided behind the optical window 3. When a source emits radiation which is incident on the optical window 3, the radiation is transmitted through the window producing a real image on the charge coupled device 10 corresponding to the source of radiation, and a number of false images due to the diffraction effect of the mesh on the window. All of these images will be detected by the charge coupled device 10. The output of the charge coupled device 10 is output to a comparator (not shown).

The centre of the real image is determined by overlaying a sample image sequentially to a number of positions on the optical window, and comparing this with the actual image. The quality of the match is determined at each position of the sample image, and the centre position of the real image is determined to be the position of the sample image which gives the best match. Once the centre position is determined, the diffraction effects can be removed by appropriate image processing techniques.

According to different aspects of the present invention, the sample or search image can be determined mathematically based on the laws of diffraction or the Fourier-transform of the grid, can be a simplified generic image, or can be a sample, or calibration, image from a real, known, source of irradiation.

Figure 4:
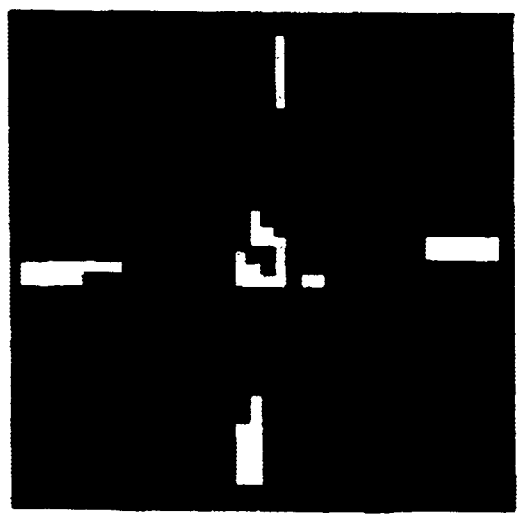
FIG. 4 shows a first example of a search image.

In a first example of the present invention, the sample image is formed using a source of electromagnetic radiation, for example a hot soldering iron or a monochromatic laser, provided as a distant point source which is viewed through the optical window by a suitable camera, for example a mid-range (3 $\mu$m to 5 $\mu$m) thermal imaging camera. The resulting image incudes the point source and the diffraction peaks, together with undesirable background. By the use of known thresholding techniques, the background can be blanked out, so the resulting image includes only black or white elements. An example of a thresholded sample image formed using a hot soldering iron as the point source is shown in FIG. 4. In this case, the mesh was slightly distorted accounting for the slightly skewed appearance of the image.

Figure 5A:
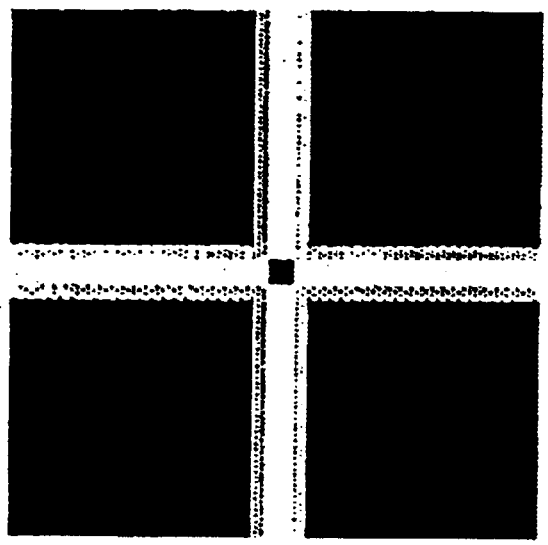
FIG. 5 shows a second example of a search image.
Figure 5B:
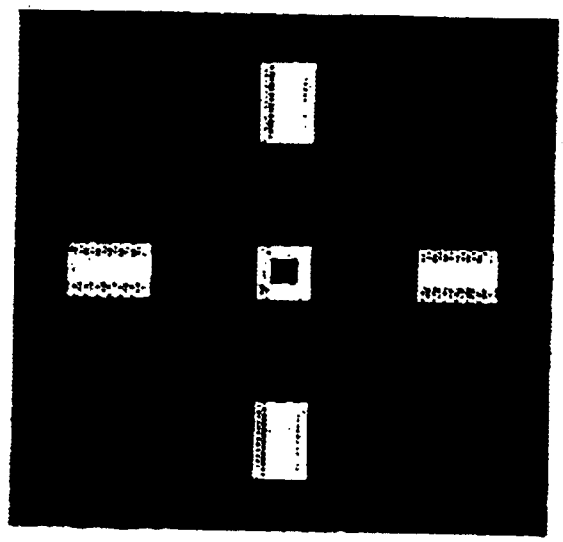

In a second example of the present invention, the search image comprises a cross, comprising either a solid bright cross centred on the centre of the imaginary source of irradiation with the arms of the cross lying parallel to the elements of the mesh, or individual elements arranged in a cross formation. Examples of suitable cross search images are shown in FIG. 5. It will be seen from these images that the edges of the main parts of the cross are bright, for example having value 63, and are two pixels wide. The edge or border is of a lower intensity grey, for example value 55. The background is black, namely value 0. The selection of a cross image is advantageous over an actual sample image according to the first example in that it can be designed to avoid imperfections which occur with a real image. For example, due to the flexibility of the wires forming a real mesh, the actual image resulting from a real source may be skewed. The amount and orientation of the skew may vary over time or under different conditions due to the flexibility of the mesh, and therefore may not be representative of the mesh. By using an idealised sample image, this can be avoided.

In a third example of the present invention, the search image is a simulated image determined mathematically from the diffraction properties of the grid. For a diffraction grating having N slits, the slits having a width of a and being separated by a distance b, the intensity of light of a wavelength A incident on a screen at infinity in the direction $\theta$ from the normal of the grating is given as:

$$I(\theta) = \frac{I(0)}{N^2} \cdot \left(\frac{\sin\beta}{\beta}\right)^2 \cdot \left(\frac{\sin N\alpha}{\sin\alpha}\right)^2$$

where $$\alpha = \frac{\pi}{\lambda}(a+b)\sin\theta$$

and $$\beta = \frac{\pi}{\lambda}a\sin\theta$$

Figure 6:
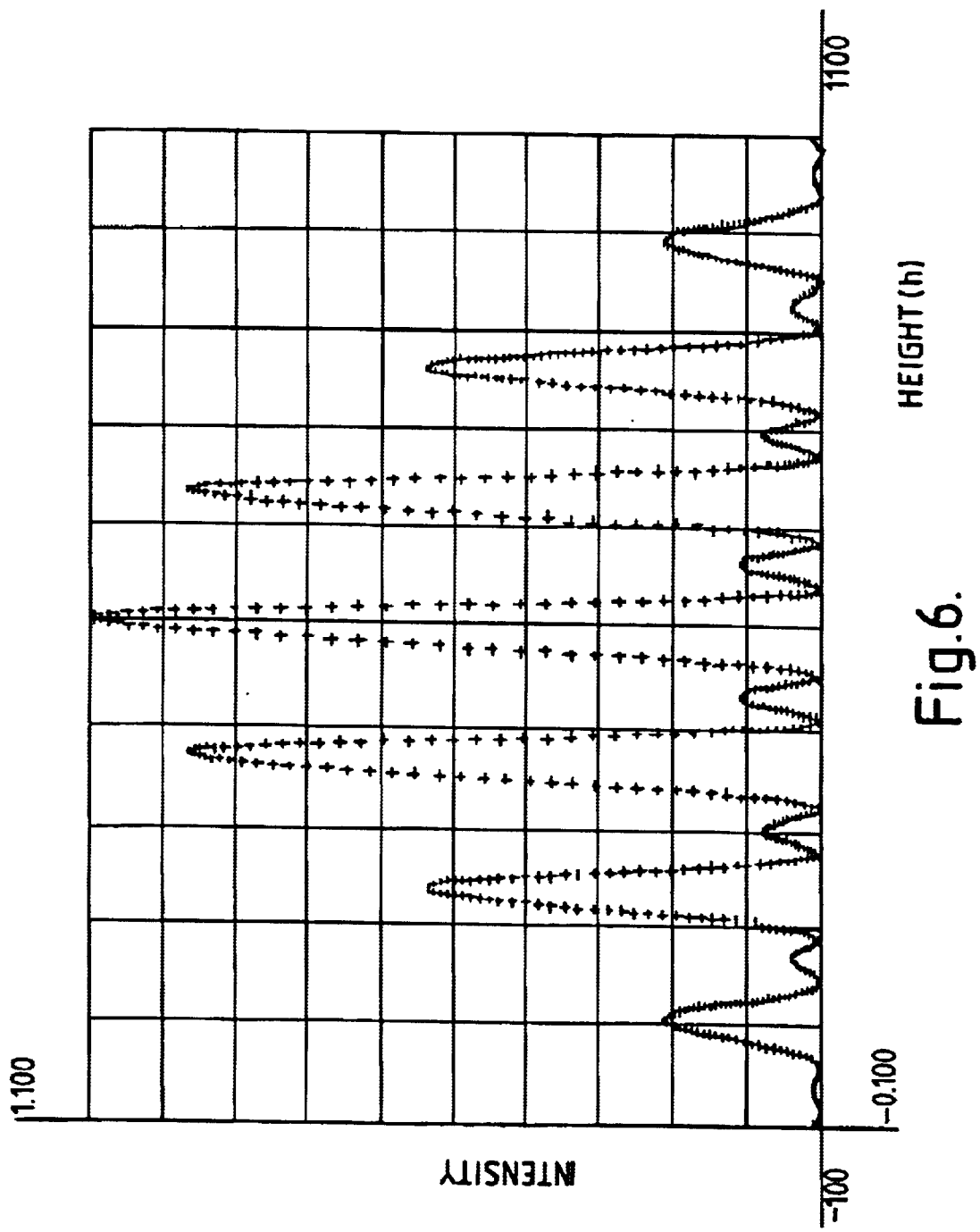

The light diffracted by the grid is focused onto a screen at the focal point f of a lens, and will be incident on the screen at a height h, where tan $\theta$=f/h From these equations, a one-dimensional profile can be derived for given values of a, b, N, f and Å. A profile is shown in FIG. 6.

As the mesh has 90° rotational symmetry, to produce the search image, cross-multiplication is used to form the required two-dimensional image. This is achieved by blanking the two-dimensional array and then adding the determined profile in both directions in a cross formation on the array. The remaining quadrants are obtained by multiplying the values in the x-component profile with the corresponding values in the y-component profile. Namely, to determine the value for a point having coordinates (a,b) in the (x,y) directions relative to the crossing point of the two profiles, the value will be the product of the value of the profile in the x direction at point a and the value of the profile in the y direction at point b. The resulting values are then thresholded to give an array of blacks and whites. Compensation of the calculated search image, for example by varying the determined values by a correction factor, may be useful in some circumstances to make the final image appear closer to a real image.

A sample or search image can be generated by use of the irradiation function of the gridded aperture which is given by the modulus squared of the Fourier transform of the pupil function.

The total transmission of a mesh is simply the sum of the transmittances of each of the diffracted orders, and is given by the obscuration ratio which is defined as the fraction of the total open area:

$$T_{total} = \frac{(g-2a)^2}{g^2}$$

For an aberration free mesh system, the pupil function can be expressed as:

$$t(x, y) = \left(rect\left(\frac{x}{g-2a}, \frac{y}{g-2a}\right) ** \sum_m \sum_n \delta(x-ng, y-mg)\right) \cdot rect\left(\frac{x}{Ng}, \frac{y}{Ng}\right)$$

where ** is a two dimensional convolution n,m are integers rect(x,y) is a two dimensional rectangular function.

The gridded aperture may be treated as a two dimensional transmission diffraction grating and in one dimension may be represented as a convolution of a square pulse and a Dirac comb. Applying the Convolution theorem, the complex image amplitude distribution is found to be:

$$\frac{\sin\left(N\pi\frac{\sin\theta}{\lambda}g\right)}{\sin\left(\pi\frac{\sin\theta}{\lambda}g\right)}(g-2a)\text{sinc}\left(\pi\frac{\sin\theta}{\lambda}(g-2a)\right)$$

Squaring this function yields the one dimensional image irradiance:

$$(g-2a)^2\text{sinc}^2\left(\frac{\pi\sin\theta}{\lambda}(g-2a)\right)\frac{\sin^2\left(N\pi\frac{\sin\theta}{\lambda}g\right)}{\sin^2\left(\pi\frac{\sin\theta}{\lambda}g\right)}$$

This can be extended to an image irradiance function for a two-dimensional grid, namely:

$$(g-2a)^4 \operatorname{sinc}^2\left(\frac{\pi\theta_x}{\lambda}(g-2a)\right)\operatorname{sinc}^2\left(\frac{\pi\theta_y}{\lambda}(g-2a)\right)\frac{\sin^2\left(N\pi\frac{\theta_x}{\lambda}g\right)}{\sin^2\left(\pi\frac{\theta_x}{\lambda}g\right)}\cdot$$

$$\frac{\sin^2\left(N\pi\frac{\theta_y}{\lambda}g\right)}{\sin^2\left(\pi\frac{\theta_y}{\lambda}g\right)}$$

where θ is small such that sin θ is approximately equal to θ.

From this, it can be determined that the mesh will generate multiple orders when $$\frac{\pi\theta_{x,y}g}{\lambda} = n\pi$$

namely at the principal maxima at $$\theta_x = \frac{n\lambda}{g} \text{ and at } \theta_y = \frac{m\lambda}{g}$$

The shape of each diffraction order is identical to that of the irradiance function of the aperture without a mesh, and hence the fraction of energy contained in each diffraction order is given by the ratio of the peak irradiance of that order to the peak irradiance resulting from the open aperture.

The sample image in accordance with any of the examples given above is overlayed at each location of the real image, and is compared to the real image generated from the actual source. The value of each pixel of the real image is compared to the value of the sample image overlayed at a particular location, and the sum of all the differences is determined as a factor indicative of the correlation between the actual image and the sample image. It will be appreciated that where there is little correlation between the real image and the sample image, the sum of the differences will be high. Where the sample image and real image correspond exactly, the sum of the differences will be zero. In a preferred example, rather than comparing every single pixel of the two images, only selective pixels are compared, for example only those pixels having a value greater than a predetermined threshold. This makes the comparison quicker, and has been found to give more accurate results. This is because the diffraction pattern forming the real image consists mostly of the brighter pixels. The darker, background, pixels which do not form part of the diffraction pattern are therefore less useful for fitting.

The comparison of the real image to a sample image overlayed at each point, and the determination of the best fit location of the sample image to the real image is best achieved using a suitable software algorithm.

In some applications, the determination of the centre point of the real image is itself sufficient. This may be the case for target detection systems in which it is desired merely to identify the location of the source. However, in many other systems, it is desirable to compensate the real image for the higher order diffraction pattern to produce an image from which these affects have been removed.

Once the location of the pattern centre coordinates has been made, it is possible to determine where the diffraction spots will reside, and therefore these can be removed, for example by isolation of small image-sections which contain a spot and in-filling the spots using local background colour information.

In one example, the location of a diffraction spot is determined based on the known properties of the grid, the wavelength or wavelengths of the incident radiation and the determined centre point of the radiation. Then, a section of pixels including this spot can be taken. By analysis of the group of pixels, the actual pixels making up the spot can be determined.

In one example this is achieved by determining the value of each pixel, and determining a histogram. This will show the number of pixels of each value. This should include two peaks, one of the value of the pixels making up the spot, and the other for the value of the background. From this it is possible to determine which of the pixels belong to the spot and which to the background, and compensation can be made to remove the spot. To assist in this determination, it is appropriate to smooth the histogram to remove jaggedness which will occur for a real image.

Compensation to remove the spot is achieved by a seep fill algorithm in which the value of the surrounding pixels is determined, and these values are used to determine the corrected value of the pixels of the spot. This is achieved by labelling those pixels which are determined to be those of the spot, and varying the value of those labelled pixels, based on an average of the surrounding unlabelled pixels.

It is usual only to carry out the compensation for a limited number of higher order diffraction spots, for example eight. For other spots, the intensity is sufficiently low that these do not have a significant effect on the overall image.

The exact nature of the diffraction effects is dependent on the wavelength or range of wavelengths of the incident radiation. For a source having a single wavelength, for example a laser, the diffraction effects will be definite spots. For a source emitting a broader band of wavelengths, the diffraction effects will be elongate.

I claim:

1. A sensor system comprising:
   a window including a mesh comprising an array of generally linear electrically conductive elements;
   a sensor for detecting radiation of a predetermined wavelength or range of wavelengths passing through the window; and
   a means for determining the angle of incidence of the radiation at the sensor comprising:
   a memory for storing a sample image representative of an expected image including the higher order diffraction effects due to the mesh;
   a comparator for comparing the actual image detected with the sample image overlayed sequentially at different locations of the actual image; and
   a detector for detecting the location at which the sample image corresponds most closely to the actual image, and for determining the centre of the image as the centre of the sample image at that location.

2. A sensor system according to claim 1, in which the sample image is determined from an actual, known, sample source incident at a known location on the window of the sensor.

3. A sensor system according to claim 1, in which the sample image is a standardised image, such as a cross-pattern.

4. A sensor system according to claim 1, in which the sample image is a simulated image determined mathematically.

5. A sensor system according to claim 4, in which the simulated image, is based on a Fourier transform of the grid at the desired frequency.

6. A sensor system according to claim 1, further comprising a means to remove or compensate for the diffraction spots due to the higher order diffraction by the window at the predetermined wavelength or range of wavelengths.

7. A sensor system according to claim 6, in which the compensation means alters the value of the pixels corresponding to the diffraction spots.

8. A sensor system according to claim 7, in which the compensation means selects a group of pixels including the diffraction spot, and adjusts the value of the pixels forming the diffraction spot to correspond to the background.

9. A sensor system according to claim 1, further comprising a filter to prevent radiation with wavelengths outside the predetermined range passing through the window.

10. A method for compensating for higher order diffraction resulting from a mesh on a window, the method comprising the steps of:

comparing the detected image with a sample image located sequentially at different locations on the image; and, determining the location of the sample image at which the actual image most closely corresponds to the sample image, and determining the point of incidence of the radiation forming the actual image as the centre of the sample image at that location.

11. A method according to claim 10, in which the sample image is generated from a real source of known location and properties incident on the sensor system.

12. A method according to claim 11, in which the search image is a generated image.

13. A method according to claim 12, in which the search image is a standard image such as a cross pattern.

14. A method according to claim 12, in which the search image is determined mathematically.

15. A method according to claim 14, in which the image is determined mathematically using Fourier transforms.

16. A method according to claim 11, in which the determination of the location of the sample image which most closely matches the real image is achieved by comparing the value of individual pixels of the real and sample images, summing the results of these comparisons, and determining the location of the sample image giving the minimum difference between the two images.

17. A method according to claim 16, in which only a limited number of pixels are compared.

18. A method according to claim 17, in which only those pixels with a value above a certain threshold are compared.

19. A method for compensating for higher order diffraction resulting from a mesh on a window, the method comprising the steps of:

comparing the detected image with a sample image located sequentially at different locations on the image;

determining the location of the sample image at which the actual image most closely corresponds to the sample image, determining the point of incidence of the radiation forming the actual image as the centre of the sample image at that location, and determining and removing the higher order diffractions spots of the actual image based on the expected effects for radiation incident at the determined location.

20. A method according to claim 19, in which the higher order diffraction spots are removed by taking a group of pixels including those which are expected to contain the diffraction spots, identify those pixels within the group which correspond to the diffraction spots, and adjusting the value of those spots.

21. A method according to claim 20, in which the pixels in the group of pixels which correspond to the diffraction spot are determined by determining the frequency or number of pixels within the group of each value.

22. A method according to claim 20, in which the pixels corresponding to the diffraction spot are adjusted to correspond to the background levelby adjusting the value of the pixel to the average of the value of the surrounding pixels which are determined not to form part of the diffraction spot.

23. A sensor system comprising:

a window including a mesh comprising an array of generally linear electrically conductive elements;

a sensor for detecting radiation of a predetermined wavelength or range of wavelengths passing through the window;

a means for determining the angle of incidence of the radiation at the sensor, a means to remove or compensate for the diffraction spots due to the higher order diffraction by the window at the predetermined wavelength or range of wavelengths.

* * * * *